(12) United States Patent
Stofanak et al.

(10) Patent No.: US 6,197,086 B1
(45) Date of Patent: Mar. 6, 2001

(54) SYSTEM AND METHOD FOR MINIMIZING SLAG CARRYOVER DURING THE PRODUCTION OF STEEL

(75) Inventors: John A. Stofanak, Hellertown; Alok Sharan, Allentown; Daniel A. Goldstein, Lafayette Hill; Elizabeth A. Stelts, Center Valley, all of PA (US)

(73) Assignee: Bethlehem Steel Corporation, DE (US)

( * ) Notice: Subject to any disclaimer, the term of this patent is extended or adjusted under 35 U.S.C. 154(b) by 0 days.

(21) Appl. No.: 09/414,505

(22) Filed: Oct. 8, 1999

Related U.S. Application Data

(63) Continuation-in-part of application No. 08/970,098, filed on Nov. 13, 1997, now Pat. No. 5,968,227, and a continuation-in-part of application No. 09/377,870, filed on Aug. 20, 1999, now Pat. No. 6,129,888.

(51) Int. Cl.[7] ..................................................... C21C 5/28
(52) U.S. Cl. ................................. 75/375; 266/93; 266/99
(58) Field of Search ............................... 75/375; 266/78, 266/90, 93, 99, 230, 45

(56) References Cited

U.S. PATENT DOCUMENTS

| | | |
|---|---|---|
| 4,172,383 | 10/1979 | Iuchi . |
| 4,222,506 | 9/1980 | Sakashita et al. . |
| 4,465,382 | 8/1984 | Iuchi et al. . |
| 4,687,344 | 8/1987 | Lillquist . |
| 4,919,542 | 4/1990 | Nulman et al. . |
| 5,094,695 | 3/1992 | Bailey et al. . |
| 5,110,365 | 5/1992 | Carter . |
| 5,272,340 | 12/1993 | Anbak . |
| 5,347,128 | 9/1994 | Puram et al. . |
| 5,968,227 | * 10/1999 | Goldstein et al. ..................... 75/375 |

FOREIGN PATENT DOCUMENTS

| | | |
|---|---|---|
| 3812560 | 10/1989 | (DE) . |
| 297 19 955 U | 2/1998 | (DE) . |
| 5362734 | 12/1978 | (JP) . |
| 55-34677 | 12/1980 | (JP) . |
| 130214 | 8/1983 | (JP) . |
| 33128 | 2/1994 | (JP) . |
| 5537828 | 12/1994 | (JP) . |

OTHER PUBLICATIONS

"Slag Carryover in Oxygen Converters: An International Review" by da Silva, et al., No Date.
Patent Abstracts of Japan, Pub. No. 59052782, Dated Mar. 27, 1984.
Patent Abstracts of Japan, Pub. No. 03017215, Dated Jan. 25, 1991.
Patent Abstracts of Japan, # JP 403134484A, Dated Jun. 7, 1991.

* cited by examiner

*Primary Examiner*—Scott Kastler
(74) *Attorney, Agent, or Firm*—Harold I. Masteller, Jr.

(57) ABSTRACT

A system and method for detecting molten slag in a tap stream between a steel making vessel such as a basic oxygen furnace (BOF) and corresponding ladle. An infrared (IR) imaging or detecting device(s) is used to image/view the BOF-to-ladle tap stream, the stream transmitting energy indicative of whether molten steel and/or slag is in the stream at a given time. Gray scale analysis is performed on pixels viewed from the tap stream to determine the number of steel pixels and the number of slag pixels in the stream at a given time. When the ratio or percentage of slag pixels exceeds a predetermined value or amount, an alarm may be actuated to cause an operator to tilt the converter upward to stop tapping, or the converter may be automatically tilted upward to stop tapping.

27 Claims, 11 Drawing Sheets

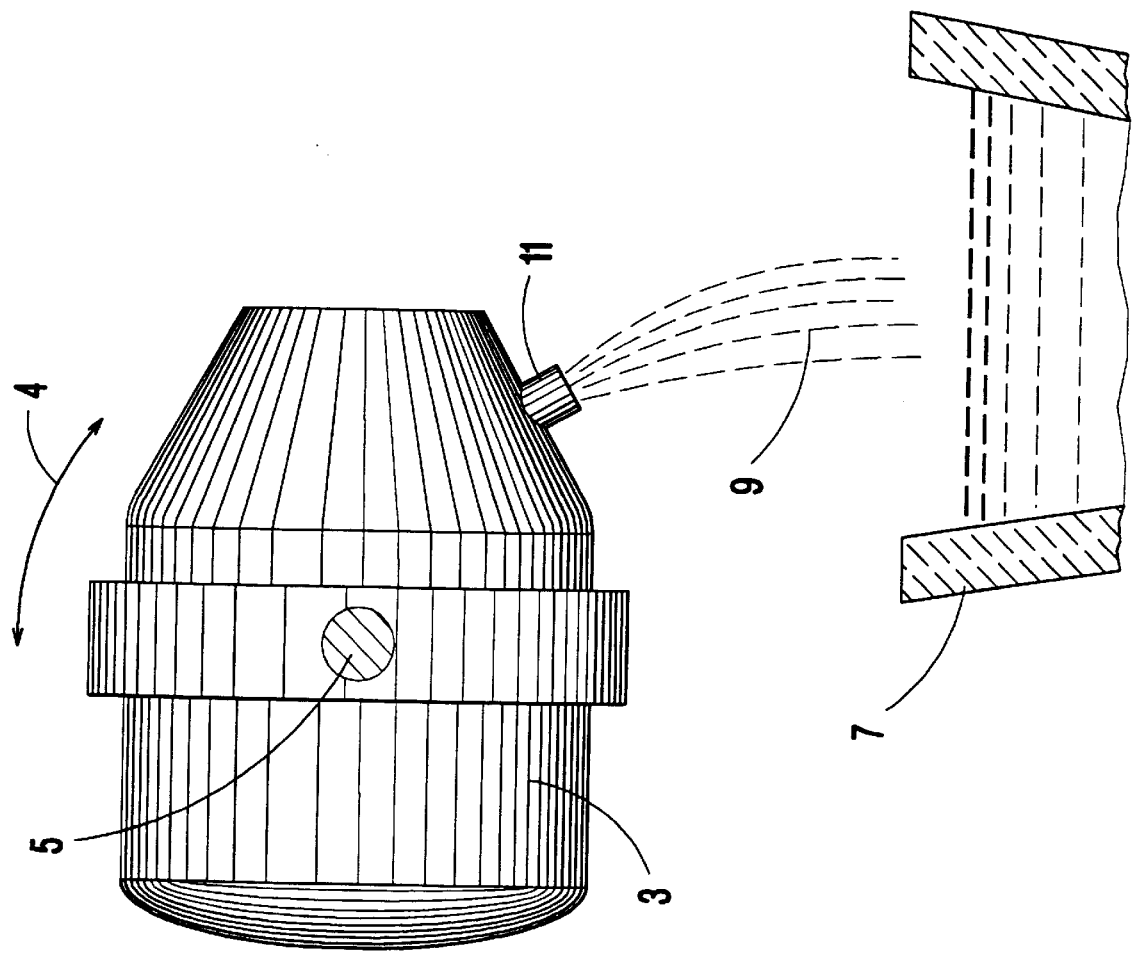
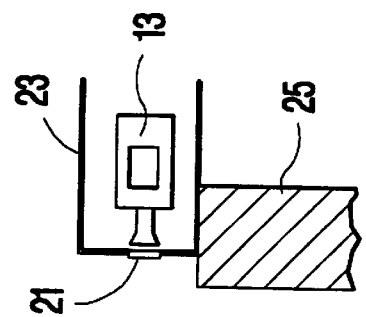
FIG. 2

US 6,197,086 B1

SYSTEM AND METHOD FOR MINIMIZING SLAG CARRYOVER DURING THE PRODUCTION OF STEEL

This application is a continuation-in-part (CIP) of U.S. patent application Ser. No. 08/970,098, filed Nov. 13, 1997 (now U.S. Pat. No. 5,968,227), and is also a continuation-in-part of U.S. patent application Ser. No. 09/377,870 (now U.S. Pat. No. 6,129,888), filed Aug. 20, 1999, the disclosures of which are hereby incorporated herein by reference.

CLAIM TO COPYRIGHT IN REFERENCE TO MICROFICHE APPENDIX

A portion of the disclosure of this patent application contains material which is subject to copyright protection. The copyright owner has no objection to the reproduction by anyone of the patent document as it appears in the Patent and Trademark Office files or records, but otherwise reserves all copyrights whatsoever. Software for carrying out some of the methods and systems described herein has been filed with the United States Patent and Trademark Office herewith in the form of a microfiche appendix (incorporated herein by reference) including numerous frames, one of which being a title frame. This software may be included as part of a chip or disc stored in a computer or camera according to certain embodiments of this invention. The microfiche appendix is entitled SYSTEM AND METHOD FOR MINIMIZING SLAG CARRYOVER DURING THE PRODUCTION OF STEEL and includes one (1) microfiche and five (5) frames.

BACKGROUND OF THE INVENTION

This invention relates to a system and/or method for minimizing or reducing slag carryover while tapping a basic oxygen furnace (BOF) converter or other vessel during the production/manufacture of steel. For example, in certain embodiments, this invention relates to the use of an infrared (IR) imaging detector to detect the presence of slag in a tap stream. This invention also relates to the use of a system of, and method for, stopping tap when a predetermined amount of slag is detected in the tap stream.

A long-standing problem in the steel making industry has been the inability to control or minimize the carryover of slag during the tapping of a BOF converter. Tapping is the pouring of molten metal from a BOF converter into a corresponding ladle, with the metal flowing from the converter through a taphole defined therein.

During the manufacture of steel, molten iron (known as hot metal) having impurities (e.g. C, Si, Mn, S, P, etc.) therein is typically introduced into a converter vessel known as a basic oxygen furnace (BOF). In the BOF converter, gaseous oxygen ($O_2$) is injected or jetted into or onto the hot metal in order to remove the impurities to desirable levels. During this purification process, fluxes such as lime (CaO) and MgO are added into the furnace and combine with oxides such as $SiO_2$, MnO, and FeO formed during the oxidation process to form molten "slag" in the converter. This slag floats on top of the molten steel in the BOF converter, because the slag's density is less than that of the molten steel.

After the oxygen is introduced into the BOF converter for an extended period of time (e.g. from about 16–25 minutes depending upon the volume of the BOF converter, the amount of molten iron and steel scrap therein, and the grade of the steel to be made) and the molten slag and steel have formed, the converter vessel is tilted and tapped. During tapping, molten steel is poured from a taphole in the side of the BOF converter into a ladle located below the same. It is during this tapping that undesirable slag carryover can occur.

When the BOF converter vessel is properly tapped, a small amount of carryover may occur at the beginning of tapping, but the slag carryover of most concern occurs at the end of tapping when most of the substantially purified molten steel has already been poured into the ladle below, and mostly slag (instead of mostly steel) remains in the BOF converter. When a typical BOF converter is tilted to a pouring position for tapping, the molten steel is poured from the taphole located in the side of the converter before most of the slag is poured, due to the different densities of the two molten materials. If the operator(s) tapping the converter does not stop tapping (or pouring) at about the precise instant when the molten slag begins to flow through the taphole, the undesirable molten slag is also poured into the ladle below on top of the already poured molten steel. When too much slag is poured into the ladle from the BOF converter, this affects the cleanliness of and reintroduces impurities such as phosphorus (P) into the steel, adversely affects the aluminum efficiency during tap, and/or prevents certain grades of steel from being made. Any attempt to remove or minimize the effect of excess slag poured into the ladle is expensive, time-consuming, and/or labor intensive. For example, if too much slag is accidentally poured into the ladle, hundreds of dollars worth of aluminum or other slag modifier(s) may have to be added to the molten ladle slag to try to minimize the levels of FeO and other unstable oxides in the slag. In summary, minimizing or reducing slag carryover from the BOF converter into the ladle is important or essential for efficient manufacturing of high quality steel.

Many techniques have been used in an effort to control the carryover of slag during the tapping of BOF converters. For example, see *Slag Carryover in Oxygen Converters: an International Review*, by Da Silva, Bergman, and Lindfors [pp. 91–95], the disclosure of which is hereby incorporated herein by reference. In this review, numerous methods for controlling the carryover of slag during BOF converter tapping are discussed. For example, it is known to use refractory plugs, metallic plugs, wooden plugs, fiber plugs, gunned clay, dart-shaped floating elements, and ball-shaped floating elements in an attempt to control or minimize slag carryover.

Certain known techniques result in the interruption of the metal pour or tap stream from the converter near the end of tapping in order to minimize slag carryover. Dart-shaped and ball-shaped floating elements are often used for this purpose. In FIGS. 4 and 5 of the above-referenced article, the often unsatisfactory results associated with these conventional methods are illustrated. For example, dart- and ball-shaped floating elements are known to be unsuccessful when the slag is thick or viscous, and it has been found that the positioning of these floating elements inside the converter is both difficult and critical. The structure of the taphole also affects the effectiveness of these types of floating elements. As discussed in the article, some steel plants have reported that the balls sometimes close the taphole too early, which may result in the leaving of purified molten steel (affecting yield) in the converter. Accordingly, it is known in the art that while floating elements may help to minimize slag carryover, they are often inefficient and the results are unpredictable. Still further, both balls and darts are undesirably expensive.

Despite the fact that so many slag carryover prevention techniques are known, it is stated at the conclusion of the above-referenced article that "none of the methods in use today can be considered to be of universal application, since each has its limitations and can only reach the expected results if specific conditions exists." In other words, there has existed a longstanding need in the art for a system and corresponding method for minimizing the carryover of slag during the tapping of BOF converters, which is usable in different environments by operators of different skill levels. No known technique has, to date, been found to be satisfactory in all commercial steel-making environments because many techniques are not considered to be efficient enough and others are too expensive for use with ordinary steel grades.

In view of the inefficiency and non-effectiveness of known BOF slag carryover prevention methods, many steel plants simply rely upon operators to visually detect when the slag portion of tapping is reached. Unfortunately, this method of slag carryover prevention is inefficient at best, as it is difficult for most humans to visually observe any visible difference between purified molten steel being poured from the converter taphole and molten slag being poured from the taphole [both are molten and yellow to white-hot].

Still another approach used by many in the trade to minimize slag carryover in BOF environments is the positioning of electromagnetic coils on BOF converter tapholes. By monitoring such a coil(s), it is possible to determine when slag is beginning to flow through the corresponding taphole. Upon the coil detecting slag, the taphole may be closed or the converter may be tipped upward to stop tapping. Unfortunately, electromagnetic coils are problematic in that they are positioned within the converter, and often break down or fail rather frequently. Another problem with coils is that they produce only an alarm, while the melter (i.e. operator) is still looking at the tap stream to make sure that slag is being poured before stopping tap. With slag splashing, converters operate for months and months at a time through many heats (e.g. up to about 30,000 heats or for up to two years). Thus, if the coil in the taphole fails, there is no way to replace or perform maintenance on it without stopping BOF operation. In all practicality, there can be no new coil until the next BOF refractory relining. This is highly undesirable, reduces yields, cuts down on efficiency, and quickly becomes rather expensive.

It is apparent from the above that there exists a need in the art for a system and method for minimizing the carryover of slag during the tapping of a BOF converter in the manufacture of steel, wherein the system/method improves reliability relative to prior art techniques, has a higher success rate than prior art techniques, results in improved slag detection, and/or reduces maintenance costs relative to known techniques.

It is a purpose of this invention to fulfill any or all of the above-described needs in the art, as well as other needs which will become apparent to the skilled artisan from the following detailed description of this invention.

SUMMARY OF THE INVENTION

It is an object of this invention to provide a method and system for automatically tilting a BOF converter upwardly in order to stop tapping when a certain or preselected amount of slag is detected in the tap stream.

Another object of this invention is to actuate an alarm to alert an operator to tilt a BOF converter upwardly in order to stop tapping when a certain or preselected amount of slag is detected in the tap stream.

Another object is to only actuate such an alarm or automatically stop tapping when the converter is within a predetermined range of tilt angles, thereby reducing the chance that tapping will be stopped during initial tapping stages when some slag may initially pour out of the tap hole prior to most of the molten steel.

Yet another object of this invention is to perform digital analysis of IR camera pixels viewing a first region of interest (ROI) in a tap stream, so as to determine the number of steel pixels and the number of slag pixels in the viewed ROI. Another object of this invention is to have an IR camera view a second ROI (and imaging software processing signals at the second ROI) proximate the mouth of a BOF converter to detect if slag pours out of the top open mouth of the converter, and to cause the converter tilt angle to be corrected (e.g. alert the operator or automatically correct converter tilt) if the same is detected.

While any IR wavelengths may be used in different embodiments, in certain preferred embodiments an object of this invention is to provide IR imaging of the tap stream during tapping using IR wavelengths greater than or equal to about 8 $\mu$m in order to detect the presence of molten slag in the tap stream.

Another object is to satisfy or meet any or all of the above listed objects.

Generally speaking, this invention fulfills any or all of the above describe needs and/or objects by providing a method of pouring molten metal from a steel-making vessel during the manufacture of steel, the method comprising the steps of:

providing a steel-making vessel holding a volume of molten metal, the molten metal including molten steel and molten slag;

providing an IR imaging camera for monitoring a stream of molten metal flowing from the vessel;

tilting the vessel thereby causing molten metal to flow in the stream out of the vessel;

monitoring the stream with the IR imaging camera using at least IR wavelengths;

determining for an image frame a first number of pixels indicative of steel in the stream, and a second number of pixels indicative of slag in the stream;

determining a ratio utilizing the first and second numbers of pixels;

determining whether the ratio is indicative of at least a preselected amount of slag in the stream; and stopping tapping when it is determined that the ratio is indicative of at least the preselected amount of slag in the stream.

In certain embodiments, the method may comprise measuring the amount of slag that flows through a tap stream from the vessel using a counter. The slag counter is for adding a number indicative of slag pixels from a frame to a previous slag number indicative of slag already having flowed from the vessel.

In certain embodiments, the vessel is one of a BOF converter and an electric steel-making furnace.

In certain embodiments, the vessel may be a metallurgical vessel for processing non-ferrous metals without departing from the scope of this invention.

In other embodiments, the vessel may be a blast furnace and molten iron is tapped into a submarine car in accordance with a method measuring the amount of slag that flows through the molten iron tap stream and into the submarine car using the counter. The slag counter is for adding a number indicative of slag pixel(s) from a frame to a previous slag number indicative of slag already having flowed into the car.

This invention further fulfills any and/or all of the above described needs/objects by providing a basic oxygen furnace (BOF) system for use in the manufacture of steel, the BOF system comprising:

a BOF converter for holding molten steel and molten slag, the molten slag floating on top of the molten steel, said BOF converter including a tap hole defined therein for enabling the molten steel to flow therefrom;

a ladle positioned at a vertical elevation below the BOF converter for receiving molten steel which flows from the BOF converter via the tap hole in a tap stream;

an imaging device for imaging the tap stream of molten steel and molten slag flowing from the tap hole in the converter into the ladle in order to detect the presence of slag in the tap stream;

a sensor for determining a tilt angle of the converter; and means for causing tapping to be stopped when a substantial amount of slag has been detected in the tap stream and when the tilt angle of the converter is greater than a predetermined value or within a predetermined range.

This invention will now be described with respect to certain embodiments thereof, accompanied by the following drawings.

IN THE DRAWINGS

FIG. 2 is a schematic diagram illustrating another embodiment of this invention similar to the FIG. 1 embodiment.

DETAILED DESCRIPTION OF CERTAIN EMBODIMENTS OF THIS INVENTION

Figure 1:
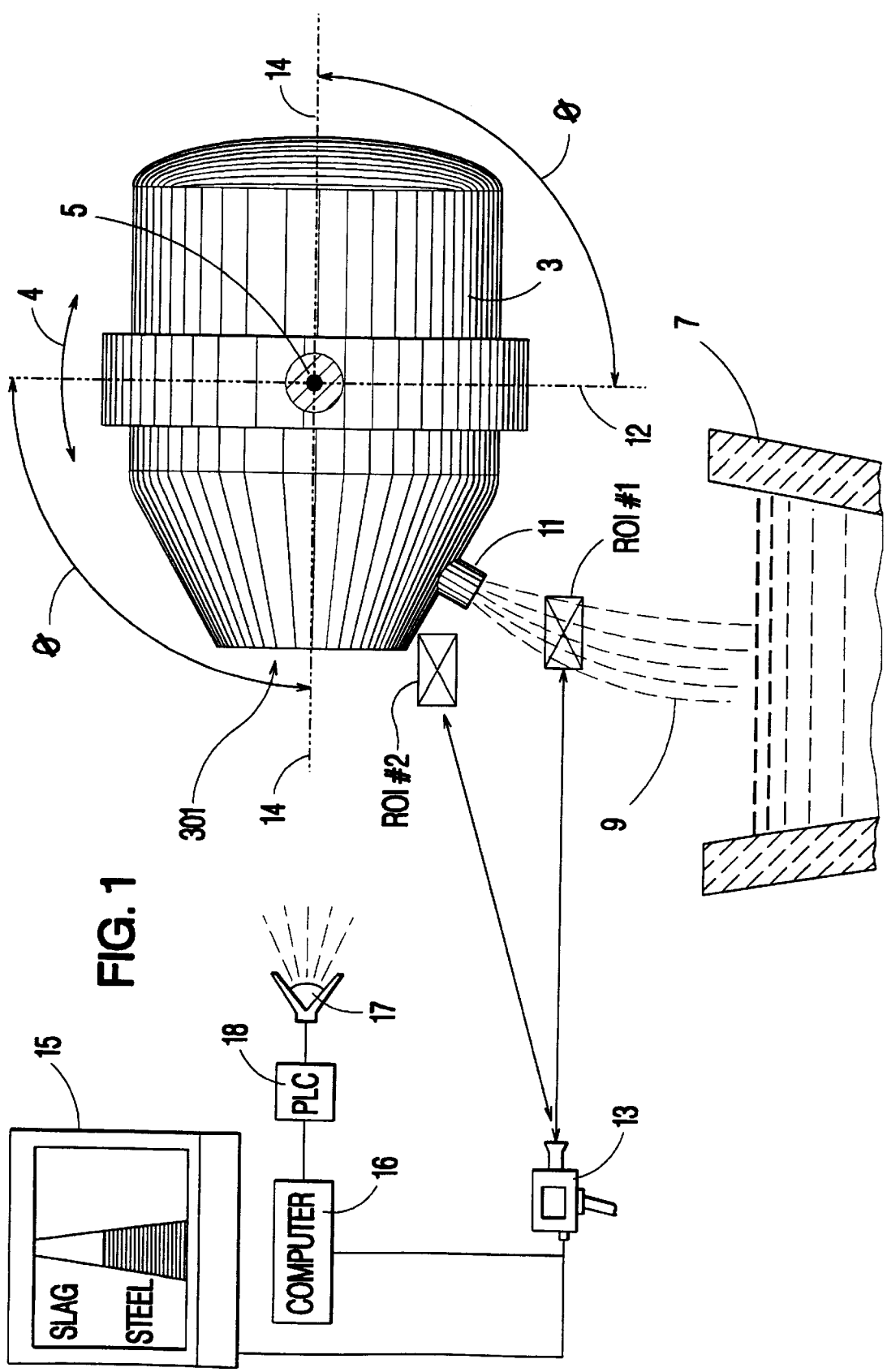
FIG. 1 is a schematic diagram illustrating a BOF-to-ladle slag detection system and method for minimizing slag carryover, according to an embodiment of this invention.

Referring now more particularly to the accompanying drawings in which like reference numerals indicate like parts throughout the several views.

FIG. 1 illustrates a system/method for controlling and/or minimizing the carryover of molten slag into a ladle 7 during the tapping of BOF converter 3 in the manufacture of steel, according to an embodiment of this invention. As shown, the system/method includes BOF converter 3 which is pivotable about approximately horizontal axis 5, ladle 7 into which the molten metal 9 is poured via converter taphole 11, IR camera 13 for monitoring molten tap stream 9, and TV monitor 15. In certain embodiments of this invention, camera 13 is positioned from about 30–150 feet (preferably from about 50 to 100 feet) from tap stream 9, so as to obtain a good low temperature background relative to the molten tap stream itself, and to reduce possibilities of camera damage close to the BOF, and to provide ease of service. This location is also cleaner than certain locations near the BOF. In certain embodiments of this invention, the field of view of camera 13 includes first and second regions of interest (ROIs) as shown in FIG. 1 (i.e. ROI #1 and ROI #2). ROI #1 is positioned so that camera 13 views tap stream 9 pouring from taphole 11 into ladle 7. ROI #1 may be of any applicable size or shape, and its size and/or location may be preselected in certain embodiments by clicking appropriately on the monitor screen of FIG. 6 for example. ROI #2 is provided in the camera's viewing zone (preferably at least partially above the tip of the tap hole) so that the camera may simultaneously view an area below the open upper mouth of the converter and above the tip of the tap hole, in order to detect when undesirable slag pours out of the top or mouth 301 of the converter (e.g. when the converter tilt angle $\theta$ is too great). Again, ROI #2 may be of any applicable size or shape, and its size and/or location may be preselected by clicking appropriately on the monitor screen of FIG. 6. In certain alternative embodiments, a first IR camera may be provided to view ROI #1 and a second IR camera provided to view ROI #2 (and imaging software processes or analyzes signals from the ROI (s)), although utilizing a single camera 13 to simultaneously view both ROIs is preferred. The imaging software (see microfiche appendix) may be stored in the camera, or in the computer exterior of the camera.

BOF converter 3 is first charge with molten iron and steel scrap. Thereafter, gaseous oxygen is introduced into converter 3 in order to drive off impurities. An aperture is provided at the top or mouth 301 of the converter so as to allow the oxygen to be introduced thereinto. Upon introduction of the oxygen, the undesirable elements oxidize within converter 3 and form slag, thereby purifying the hot metal and transforming it into molten steel. Because BOF slag has a density less than that of the molten steel, the slag floats on top of the molten steel within converter 3.

After the oxygen gas has been introduced, converter 3 is pivoted or tipped 4 about fixed axis 5 to a tilt angle $\theta$ (angle $\theta$ is defined between vertical axis 12 passing through pivot axis 5 and longitudinal axis 14 of the converter) so that a tap stream 9 of molten metal is poured from converter 3 into ladle 7. When properly pivoted, first steel flows out of taphole 11 (along with a small amount of slag) through ROI #1 into ladle 7 during tapping because the slag layer is positioned at an elevation above the steel and the taphole. Thereafter, as the steel is drained from converter 3, the operator continues to pivot converter 3 about axis 5 to greater tilt angles $\theta$ until most of the steel is drained from the furnace and the slag layer reaches the taphole 11. Infrared (IR) camera 13 and TV monitor 15 monitor tap stream 9 at ROI #1 between taphole 11 and ladle 7, in order to detect when slag begins to enter tap stream 11 and flow into ladle 7 in substantial amounts.

According to different embodiments of this invention, any IR wavelengths may be used by the camera to view slag/ steel. However, in preferred embodiments, improved slag detection in tap stream 11 results when (i) IR camera 13 utilizes only wavelengths in the far IR range (e.g. IR wavelengths greater than or equal to about 8 $\mu$m), and/or (ii) far-IR wavelengths (e.g. greater than or equal to about 8 $\mu$m) are monitored by camera 13 and other IR wavelengths are or may be filtered out. Upon analysis, it has been found that these longer IR wavelengths (unlike the shorter wavelengths) are less susceptible to being blocked by airborne dust particles and smoke which are prevalent in BOF environments. Still further, as will be discussed below, it has been found that the airborne gases (e.g. $CO_2$ and $H_2O$) that are commonplace in BOF environments absorb or block out certain near-IR and mid-IR wavelengths, but do not substantially absorb or block many far IR wavelengths (i.e. those greater than about 8 um). Furthermore, these longer IR wavelengths work better because at these wavelengths the difference in emissivity between slag and steel is greater, resulting in a greater change in color on the monitor. In certain embodiments, only these long wavelengths are monitored, while in other less preferred embodiments other wavelengths may be monitored along with these long wavelengths. In still other embodiments, wavelengths in the range of from about 1–7 $\mu$m may be monitored in certain embodiments, with imaging software being utilized to manipulate viewed image data so that slag can be detected in steel in a tap stream or the like.

Preferably, camera 13 is set so as to predominantly utilize IR wavelengths of at least about 8 $\mu$m (i.e. long wavelengths), and most preferably wavelengths from about 8 $\mu$m to 12 $\mu$m. The slag is detected as a color change on monitor 15, so that visual detection by the operator is effective.

The instant invention reduces maintenance costs relative to conventional slag carryover minimizing techniques, has improved reliability and efficiency relative to these techniques, and improves the manufacturer's control over slag carryover in BOF environments. By reducing BOF slag carryover, the following other advantages are obtained: FeO content in ladle slag is reduced, consumption of expensive slag modifiers is reduced, phosphorus reversion in the ladle is reduced, steel desulfurization in the ladle is improved, steel cleanliness is improved, the use of expensive slag retaining systems (e.g. darts and balls) is reduced, iron yield is improved, reliability of slag detection is improved, and there is no need to maintain leads and detector coils on the BOF itself.

Figure 5:
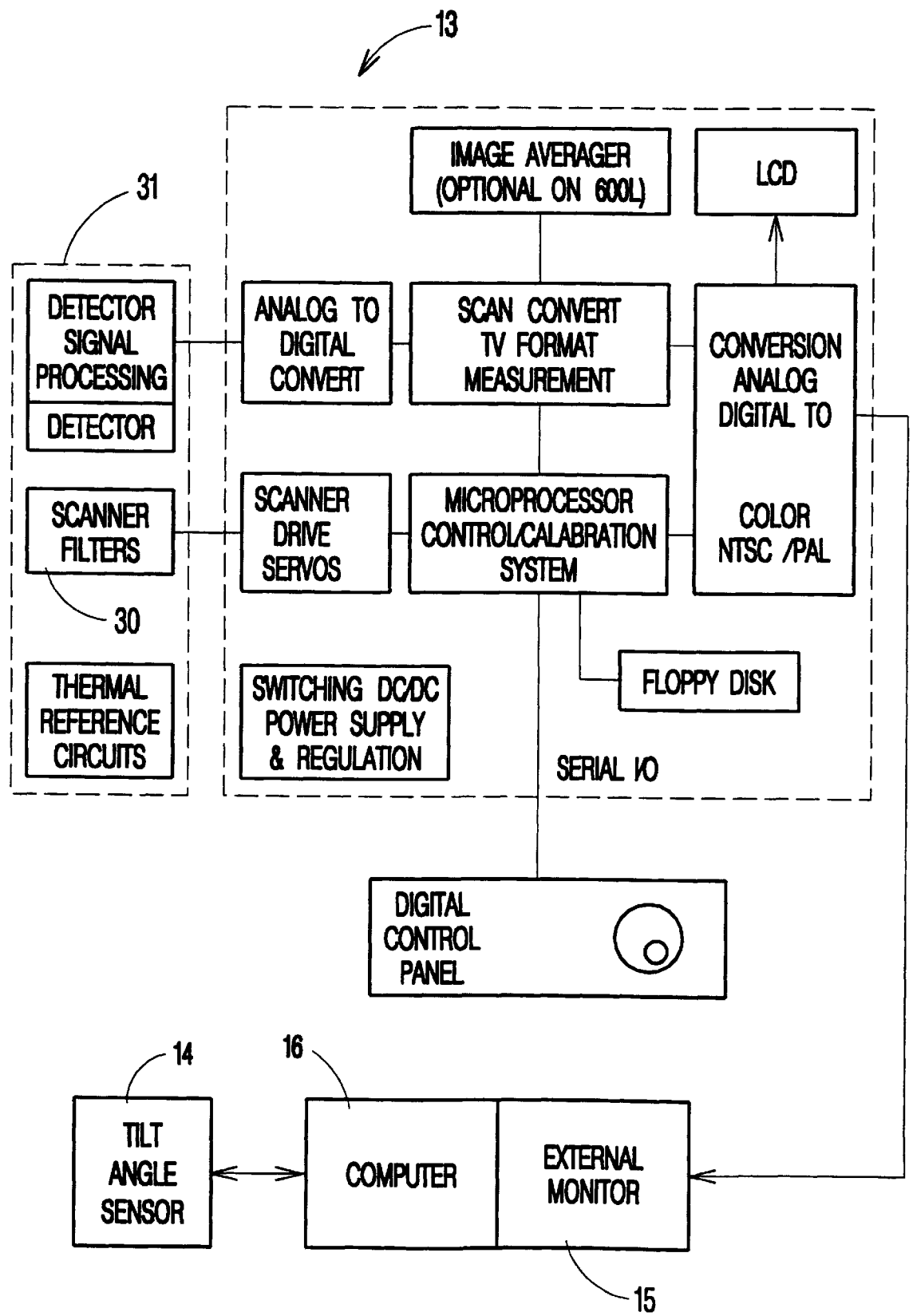
FIG. 5 is a block diagram of an IR camera that may be used in certain embodiments of this invention.

FIG. 5 is a block diagram of an IR camera 13 that may be used to monitor tap stream 9 in certain embodiments of this invention. A preferred camera 13 is a Model 760 IR imaging radiometer, available from FLIR, Inc. Camera 13 may be a self-contained thermal imaging, archival, and analytical system with an integral color LCD, micro floppy diskette drive and integrated cooler, which may be used with external monitor 15. Monitor may be part of or in communication with personal computer 16 (computer 16 may be programmed according to the microfiche appendix attached hereto, so that the steps of FIG. 9 may be performed). The camera may include a mercury/cadmium/telluride detector that is cooled by an integrated cooler to 77 Kelvin for maximum thermal sensitivity and high spatial resolution. With regard to the camera's optical path, thermal radiation from the tap stream ROI #1 and/or ROI #2 enter(s) an evacuated scan module through a collimating lens, is deflected by horizontal and vertical scan mirrors, and exits through a second window to pass through the detector lens on to the detector. As illustrated, camera 13 includes circuits to process, digitize, and reformat the IR signal for display in color or black and white on the integrated LCD, and/or external video/TV/computer monitor 15. The microprocessor accesses individual picture elements (i.e. pixels), then calculates temperatures using calibration tables corresponding to the optical filter/lens combination in use. Optical filters 30 in the scanning section 31 of camera 13 can tailor the spectral response of the camera to optimize measurement of BOF tap stream 9. In preferred embodiments of this invention, a high pass filter at 30 is implemented within camera 13 to absorb or block transmission of IR wavelengths of from about 0–8 $\mu$m, thereby enabling camera 13 to monitor the tap stream by only using far IR wavelengths greater than or equal to about 8 $\mu$m (i.e. the longwave IR region). In certain embodiments, the high pass filter allows substantial transmission of only IR wavelengths of from about 8–14 $\mu$m, or 8–12 $\mu$m, and substantially blocks transmission into and/or through the camera's scanner of all other IR wavelengths. On the above-referenced preferred camera, this high pass filter is selected by name in a SETUP menu, and inserted automatically. Using this filter(s), camera 13 responds to the sum of the emitted, reflected, and transmitted energies coming from the tap stream. This combination of energies is called the stream's radiosity. To obtain the stream's temperature, the emitted energy is extracted by subtracting the reflected and transmitted energies from the incoming radiosity. The result is scaled up by the emittance to obtain a blackbody equivalent value that may be converted to temperature by querying a calibration look-up table. The resultant temperature of the tap stream, showing color (and emissivity) differences between the molten steel and slag, is shown on monitor 15. While the above-identified IR imaging camera 13 is used in certain embodiments of this invention, it will be appreciated by those of skill in the art that other types of IR imaging devices/cameras may instead be used, so long as they are capable of using long IR or other wavelengths to detect slag in the tapstream (e.g. microbolometers). It will also be appreciated by those skilled in the art that other types of IR imaging devices/cameras may instead be used, so long as they provide contrast between steel and slag, even if such contrast is provided by using image enhancement software in instances wherein the selected IR imaging device/camera fails to provide a direct image having good contrast between steel and slag.

Tilt angle sensor 14 is also shown in FIG. 5 as being in communication with computer 16. Sensor 14 measures the angle(s) $\theta$ at which the converter is tilted during tapping, and outputs the same to the computer for use in the comparison steps shown in FIG. 9. Sensor 14 may be connected to rotational axis 5 of the converter and measure its rotation, or alternative may optically measure tilting of converter 3 (or furnace of FIG. 10) through any suitable means such as an IR camera.

In other preferred embodiments a ThermaCAM ULTRA hand-held IR imaging radiometer (e.g. models SC2000, PM395, PM295, and/or PM 195), available from FLIR, may be used as camera 13. This is a palm-sized focal plane array radiometer with full screen temperature measurement and built-in image storage and analysis capabilities. Data can be stored on removable solid state flash or SRAM PCMCIA memory cards (SC2000, PM395, PM295). Calibrated IR data is output as TV compatible video for extensive real-time data analysis. The SC2000 has a digital video port that outputs real-time 14 bit digital video data. This may also use a 320×240 microbolometer focal plane array detector in certain embodiments. In other embodiments, camera 13 may be a Thermovision model 570 camera that includes a focal plane array, uncooled microbolometer 320×240 pixels, available from FSI Automation, Bothell, Wash.

When far IR wavelengths are utilized by IR camera 13 to view tap stream 9, the emissivity difference between the molten slag and molten steel on TV monitor 15 becomes readily apparent. Referring to FIG. 1, the molten steel in tap stream 9 appears rather dark compared to the molten slag, and when slag begins to enter tap stream 9 such slag appears on monitor 15 as a color (e.g. bright white) which is much different than that of the steel. In certain embodiments, the slag is represented by a white color, while the steel by a darkened color. This enables tapping operators (or computers or image analysis systems in FIGS. 6–9) to easily determine when slag has entered the tap stream 9 so that an operator(s) can stop tapping or pouring when a substantial white coloring (or other change in color) appears in stream 9 on monitor 15. Thus, when the operator (or computer 16 or image analysis systems via the IR camera in the FIGS. 6–10 embodiments) looks at monitor 15 and sees that slag is beginning to dominate tap stream 9, he stops tapping by either upwardly tilting converter 3 about axis 5 or closing taphole 11. In such a manner, excessive slag carryover from converter 3 into ladle 7 is avoided.

According to certain embodiments of this invention, tapping of BOF converter 3 can be automatically stopped or halted when camera detects a predetermined amount of slag in tap stream 11. For example, using gray scale comparison ratios discussed below as to FIGS. 6–9, the tapping system can be programed to stop (i.e. tilt the converter upward or upright) when contrast in the monitored tap stream reaches a predetermined level indicating the presence of a predetermined amount of slag in the tap stream. According to still further embodiments of this invention, the tilting of the BOF converter during tapping can be controlled by the amount of slag detected by camera 13 in the tap stream. For example, at the beginning of tapping, the system can be programmed to tilt the converter 3 to a degree θ where less than a predetermined amount of slag is being poured from the tap hole 11 into ladle 7, and the tilt angle θ of converter 3 can thereafter be adjusted during tapping in accordance with the program so as to minimize slag in the tap stream. Then, as set forth above, when a predetermined amount of slag (a predetermined emissivity difference) is detected in the tap stream after tapping for a predetermined amount of time (e.g. near the end of tapping), the system can automatically stop tapping. By correcting tilt angle e of the BOF converter during tapping, the presence of slag in the stream can be substantially eliminated until the end of tapping.

FIG. 2 illustrates an embodiment of this invention that is similar to the FIG. 1 embodiment, except that converter 3 and ladle 7 have different structural characteristics. Converter 3 still pivots about axis 5 to pour molten metal stream 9 out of taphole 11. When camera 13 (or software stored therein or in the computer) detects slag in stream 9, an operator may be alerted so as to stop tapping as discussed above. Another significant characteristic regarding the FIG. 2 embodiment is the presence of circular or rectangular window 21 located within camera housing 23. Camera 13 is mounted on structure 25 within housing 23, so that the camera views tap stream 9 through window 21. In preferred embodiments of this invention, window 21 is transmissive to far IR wavelengths (e.g. IR wavelengths greater than about 8 $\mu$m). In certain embodiments, window 21 is made of glass or other material that is substantially transmissive or transparent to all or only some IR wavelengths. However, window 21 need not be transparent to non-IR wavelengths in certain embodiments.

In certain embodiments, window 21 is made of a substantially transparent monocrystalline material including calcium fluoride, this being a non-hydroscopic window. Such a window is available from Heise's Online Thermographic Services (H.O.T.S.), located in Knoxville, Tenn., as its H.VIR Comet window 21. This window is about 95+% transmissive of IR wavelengths and nearly 100% transmissive of visual wavelengths. Also, longwave inspection windows 21 from HOTS are also available, such as model no. H.VIR 75 which is transmissive at least about 95% (e.g. 98%) to IR wavelengths of 8–12 $\mu$m, such a window having no UV sensitivity, and a thermal conductivity of about 11.72 W/mK at 13 degrees C. This type of window may or may not be transmissive to other wavelengths outside of the 8–12 um range. Preferably, window 21 has a transmission of at least about 95% for IR wavelengths greater than about 8 um.

In other embodiments, window 21 may include ZnSe, GaAs, Germanium, CdTe, or ZnS, and have similar characteristics to those described above. However, coatings may be required on some of these alternative windows, such as ZnSe inclusive windows.

Window 21 is in addition to possible filters located within camera 13 which allow an operator to selectively determine which wavelengths camera 13 utilizes. Different materials can be used as window 21, and the use of this window instead of a filter is for the protection of the camera. In certain embodiments, the window has a high transmittance in the 8–12 um range, and thus we are able to use the IR camera or imager with its own 8–12 um filters if that is the wavelength range selected for monitoring the stream.

Figure 3:
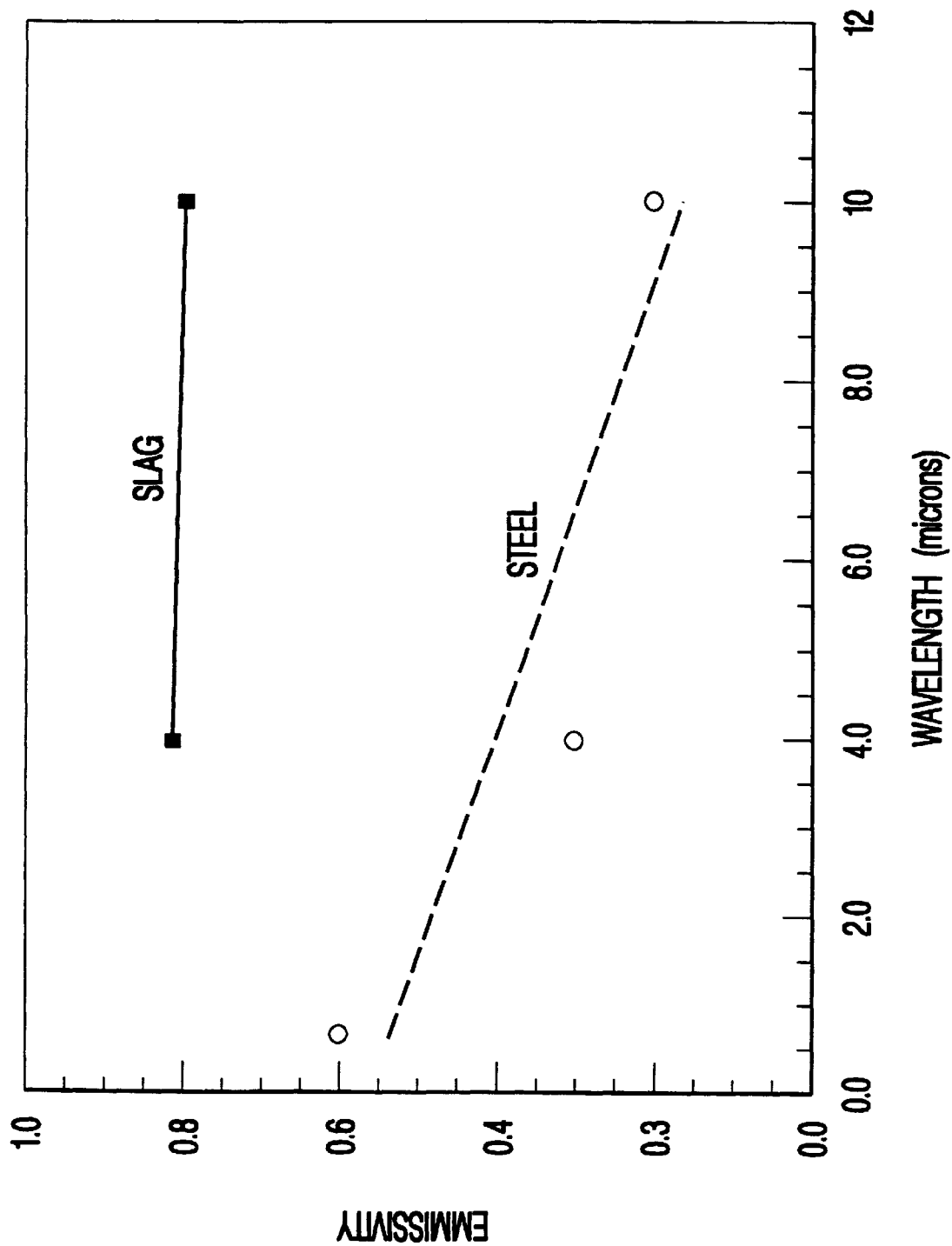
FIG. 3 is an emissivity v. wavelength ($\mu$m) graph illustrating an emissivity v. wavelength plot of both molten slag and molten steel.

FIG. 3 is an emissivity v. wavelength graph illustrating how the emissivity of both slag and steel vary as a function of IR wavelength. As can be seen, when far IR wavelengths (e.g. at least about 8 $\mu$m) are utilized to determine if there is slag within a molten steel tap stream, it is more easily detectable than at other wavelengths because of the greater difference between the emissivity of steel and slag at these higher wavelengths.

Figure 4:
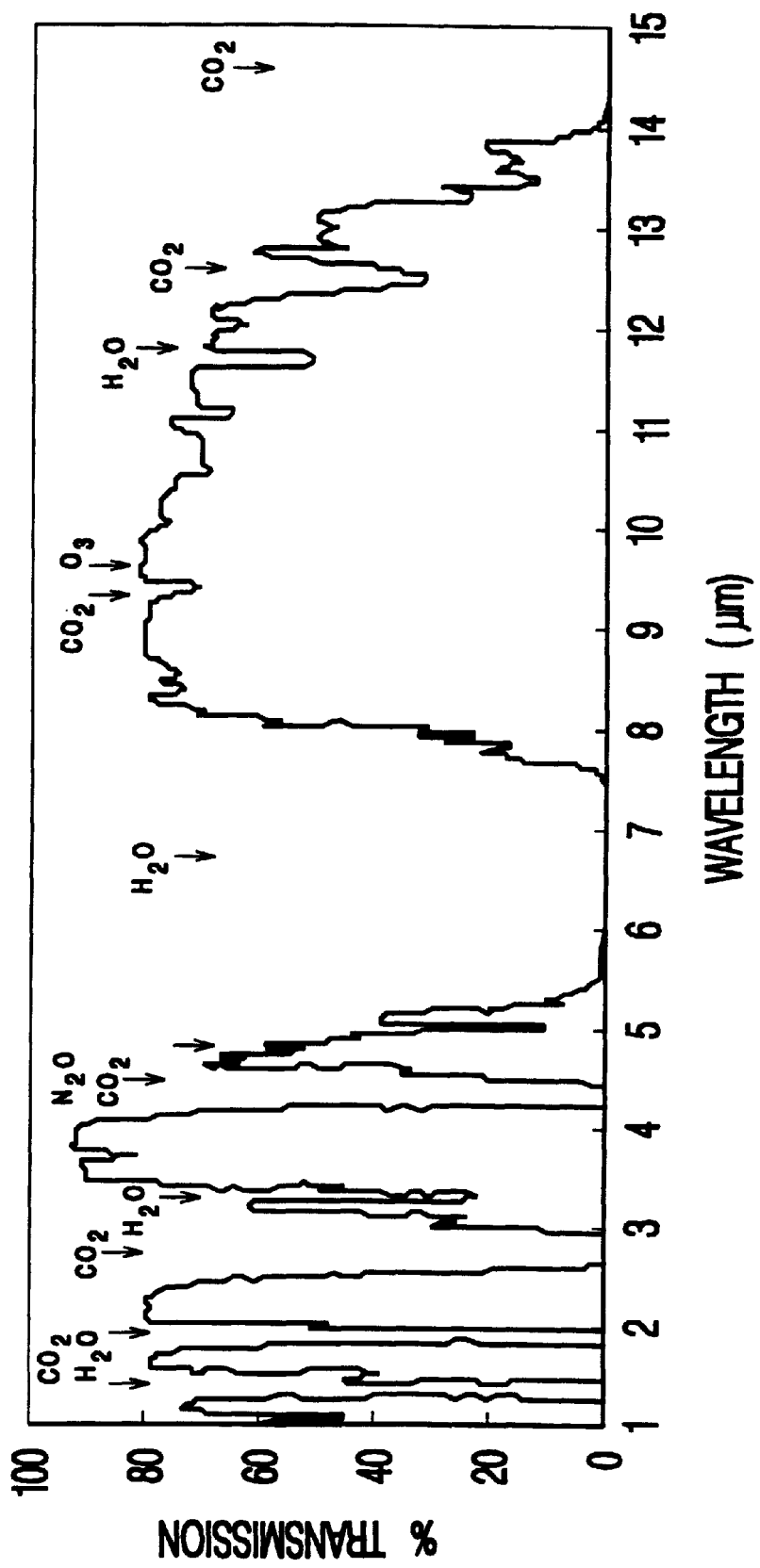
FIG. 4 is a percentage transmission v. wavelength ($\mu$m) plot for the total IR region, illustrating how certain airborne gases present in BOF environments absorb particular IR wavelengths, and reduce their utility.

FIG. 4 is a transmission v. IR wavelength graph illustrating the extent to which particular gases absorb (i.e. prevent transmission) of certain IR wavelengths. For example, it is noted that $H_2O$ gas substantially absorbs a large portion of the wavelengths between 5 and 8 $\mu$m. In a similar manner, it is noted that $H_2O$ and/or $CO_2$ absorb many wavelengths between 1 and 5 $\mu$m. This graph illustrates that the greatest transmission through these gases (e.g. $CO_2$, $O_3$, $H_2O$) takes place when wavelengths from about 8–14 um are utilized. Because $CO_2$ and $H_2O$) are gases which frequently exist proximate BOF tap streams, it can be seen that the slag and steel in a BOF tap stream can be more easily seen/detected using high IR wavelengths (e.g. wavelengths of at least about 8 $\mu$m). However, FIG. 4 also illustrates that other wavelengths may also be used to detect slag, these other wavelengths not being substantially blocked in embodiments that are not as preferred (e.g. 1.4–1.8 $\mu$m, 1.9–2.5 $\mu$m, 2.9–4.1 $\mu$m).

Figure 6:
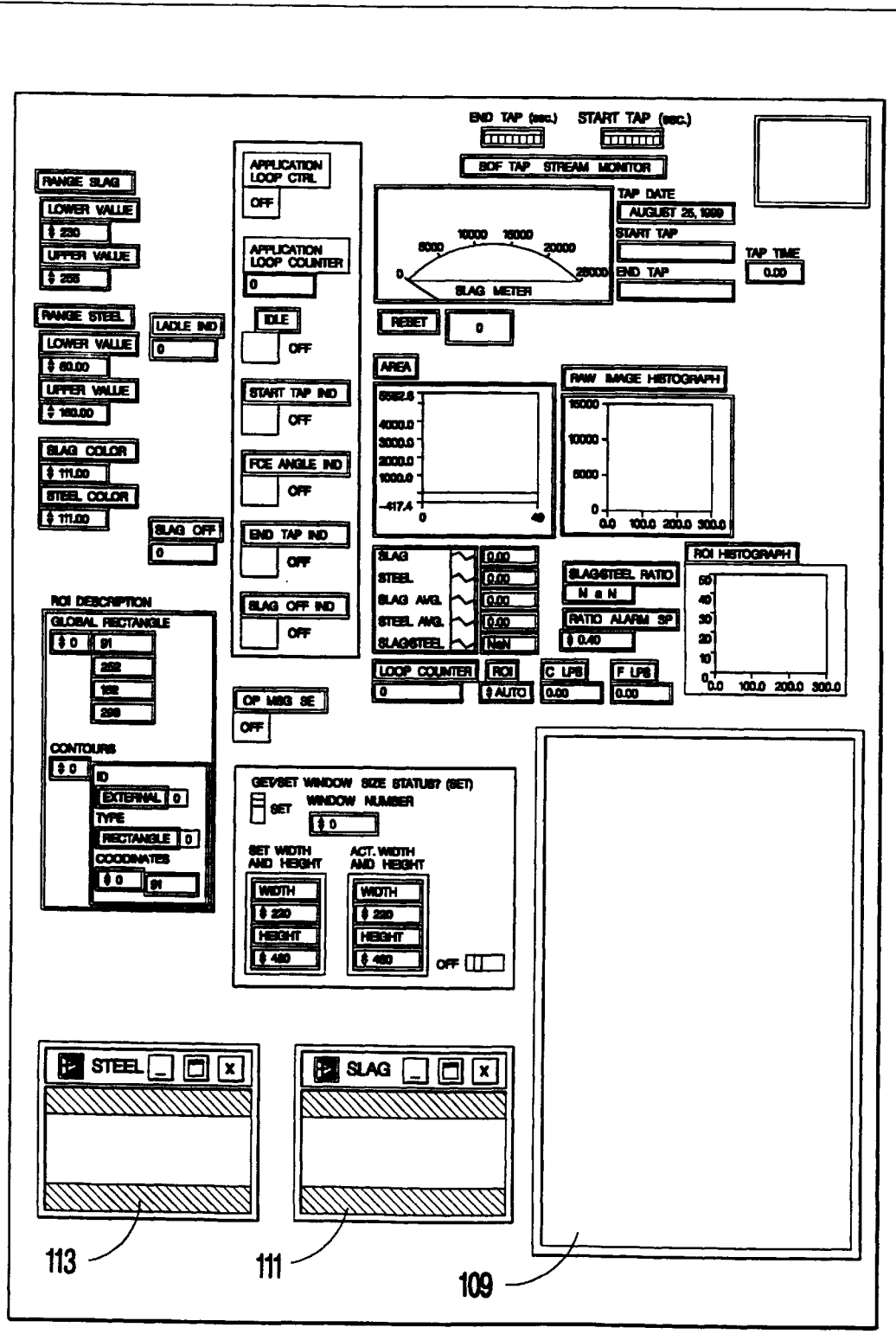
FIG. 6 is a view of a computer/monitor display screen displaying information according to the embodiments of this invention.
Figure 7:
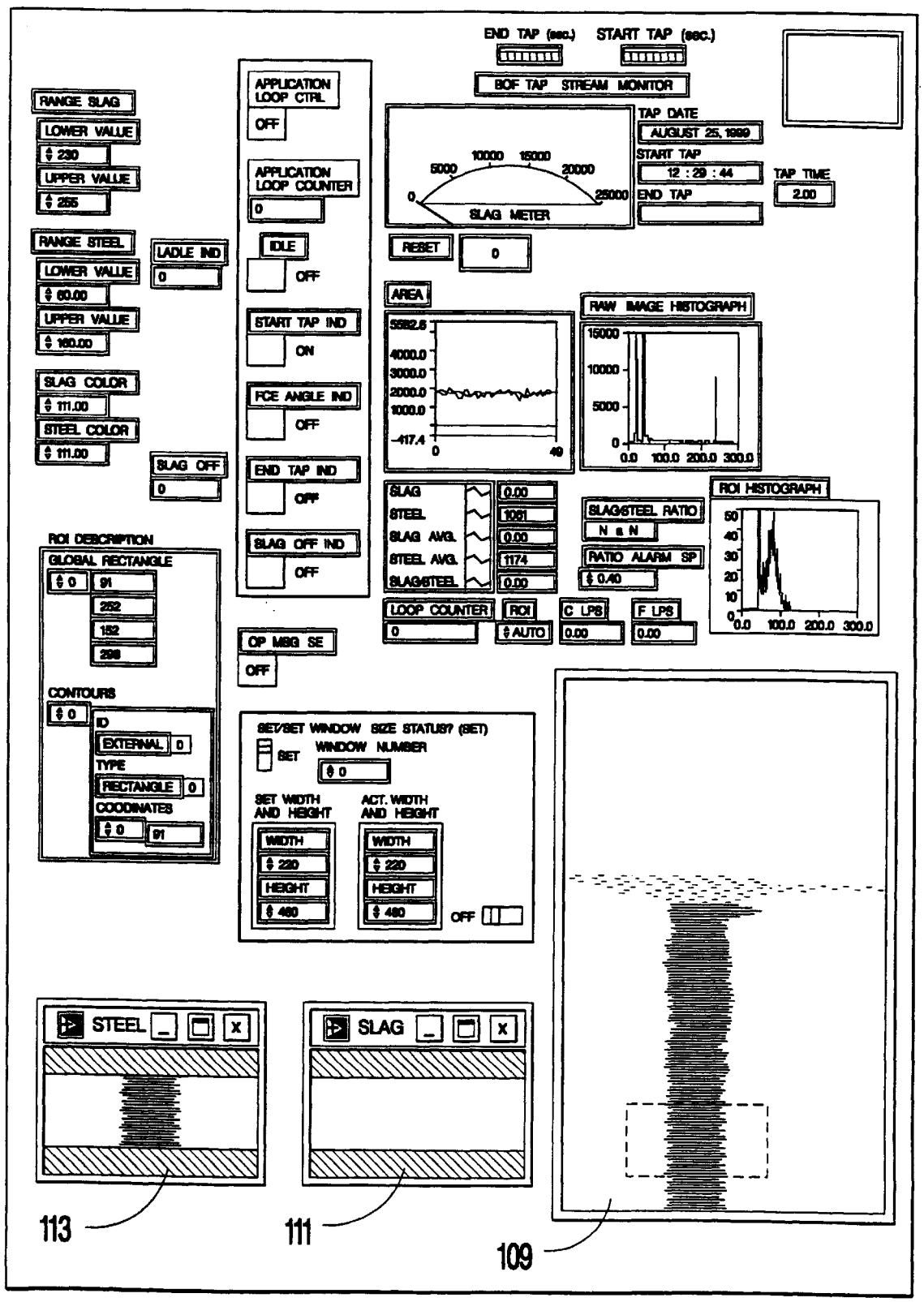
FIG. 7 is a view of the FIG. 6 screen when molten steel with no substantial amount of slag therein is in a tap stream being poured from the BOF converter to the ladle.
Figure 8:
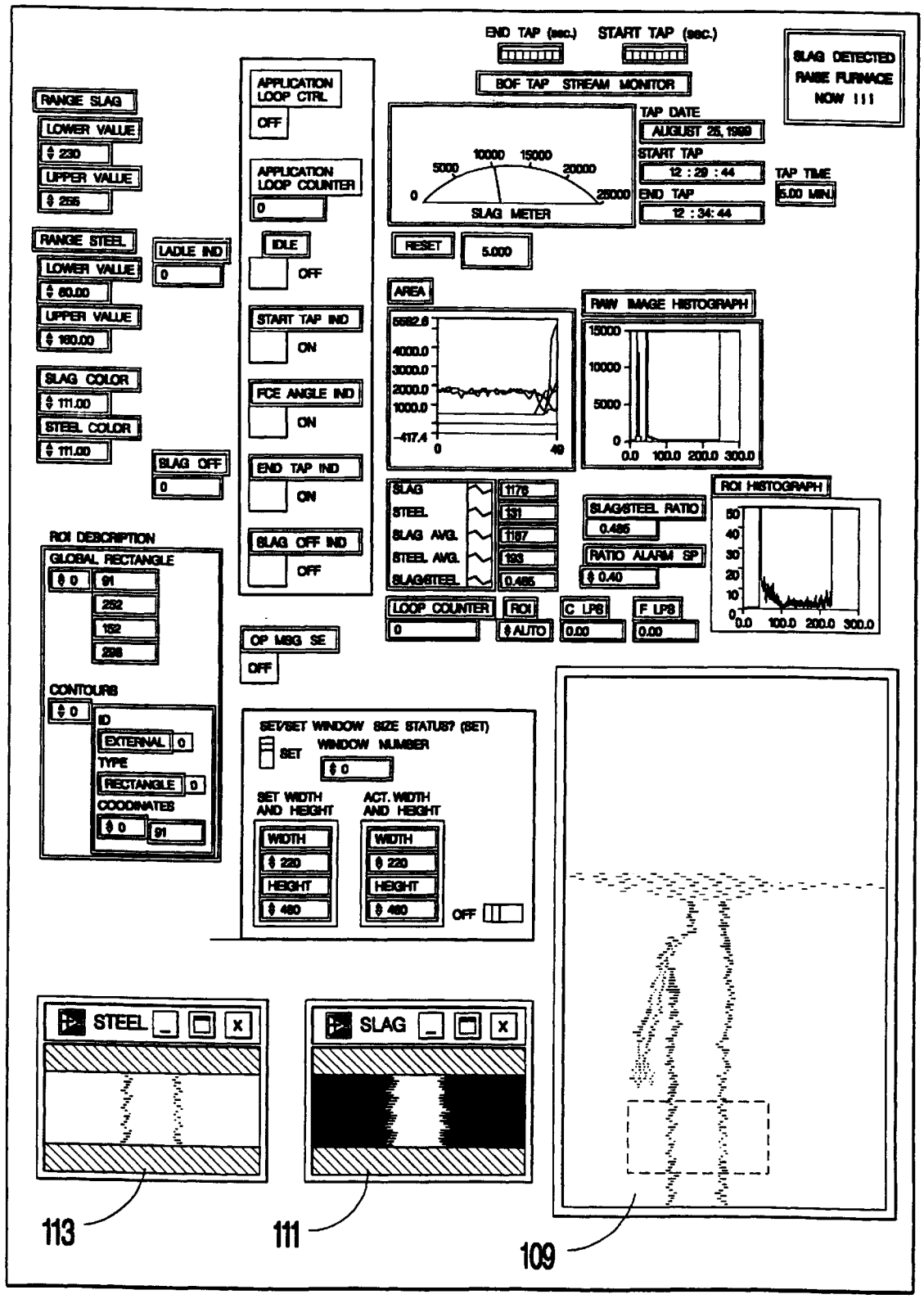
FIG. 8 is a view of the FIGS. 6–7 screen when a substantial amount of slag is in the tap stream being poured from the BOF converter to the ladle.
Figure 9:
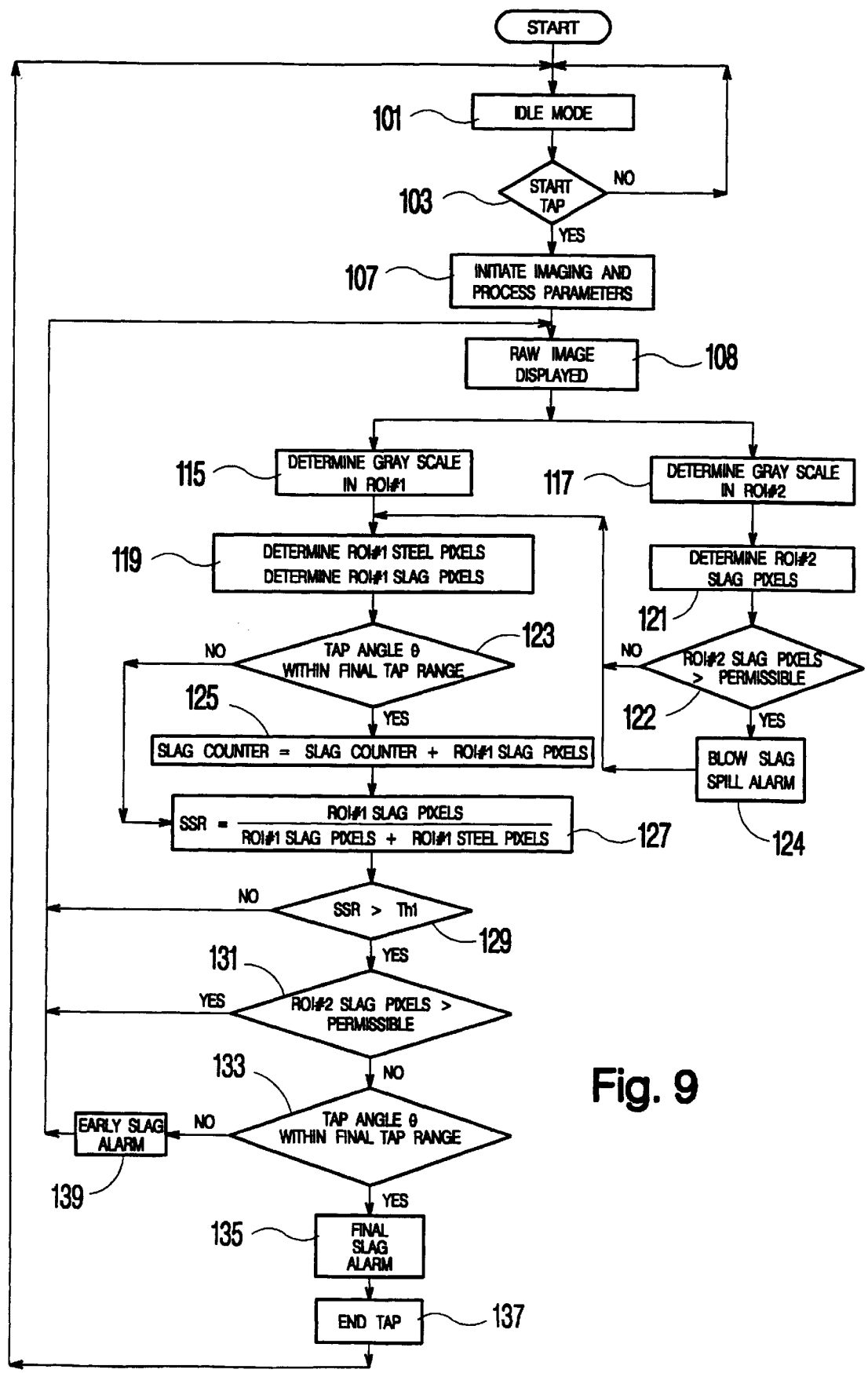
FIG. 9 is a flow chart illustrating steps taken to reduce or minimize slag pouring from the mouth of the converter according to the FIG. 1 embodiment of this invention.

FIGS. 6–9 are illustrative of another embodiment of this invention, where FIGS. 6–8 illustrate computer screens on a monitor viewable by an operator at different stages and FIG. 9 illustrates steps performed to reduce or minimize slag carryover into ladle 7. By using imaging analysis to process the output of camera(s) 13, methods of using computer 16 for detecting steel to slag changeover in tapping stream 9 are more efficiently possible. The system can output an electrical signal to sound an audio or visual alarm 17 (shown in FIG. 1) and/or automatically raise converter furnace 3 upon substantial slag detection in stream 9 in ROI #1, thereby minimizing or reducing the total amount of slag carried over into steel ladle 7 from a heat.

Referring to FIGS. 6–9, components which may be utilized include IR camera(s) 13, optics discussed above, computer 16 programmed using the attached software, monitor 15 (e.g. computer monitor and/or external monitor), analog and digital I/O, and audio or visual alarm. Camera 13 is preferably positioned in a manner that allows it to monitor the stream via ROI #1 regardless of the tap furnace's tilt angle θ. The system uses hardware and software made by National Instruments, located in Austin, Tex. The hardware includes a PXI 1000 chassis, 8155 embedded controller, PXI Image Acquisition card, PXI 6040E I/O card, PXI 8210 Ethernet/SCSI interface card, and PXI 8220 PCMCIA card. The software includes LabVIEW 5.0, IMAQ 1.5, and Microsoft NT 4.0 operating system (see also the microfiche appendix attached hereto). The application program was written in LabVIEW 5.0 and IMAQ 1.5 to process the video signals from camera 13 and determine how much slag is in tap stream 9 at a given moment or over a given period.

Referring to FIG. 9, the system begins in idle mode 101. At the beginning of tapping when the operator causes converter 3 to be tilted to a starting tap angle θ, the operator pushes a "start tap" button at 103 that sends a digital signal to the PLC, shown as 18 in FIG. 1. The converter is tilted to begin pouring of tapping stream. The signal caused by actuation of the "start tap" button is conveyed to the vision system to initiate the imaging and processing parameters at 107 of ROI #1 and/or ROI #2 just prior to or just after the beginning of tapping. A raw image is displayed on the computer or monitor screen in area 109 shown in FIGS. 6–8, as will be discussed below (FIG. 6 illustrates the screen with no steel or slag being poured, FIG. 7 illustrates the screen with mostly steel in the tap stream, and FIG. 8 illustrates the screen later in the process with a substantial amount of slag in the tap stream). Processing the video images from camera 13 is done as follows.

IR camera(s) 13 views the tapping stream 9 at preselected ROI #1 and also views an area via ROI #2. The standard RS-170 video signal for both ROIs is transferred from infrared camera(s) 13 to the vision system through a RG 59 video cable. The video frames are captured by the image acquisition card in approximate real time. The maximum resolution in certain embodiments of the image acquisition card is 640 by 480 pixels, although other cards with different maximums may instead be used in other embodiments. The image is referred to as the "raw image" and is displayed on computer monitor 15 in dedicated window 109 at step 108. ROI #1 is selected for the image analysis, with ROI #1 preferably being selected to encompass an area slightly larger than the full width of the tap stream as viewed from camera 13. Referring to FIGS. 6–8, area/window 111 on the computer screen is used to display slag and area/window 113 to display steel in the stream.

It should be understood, however, that IR camera(s) 13 could just as well provide a digital output, e.g. a 14 bit output, that is received by computer 16 for further processing as described herein without departing from the scope of this invention. Such state of the art IR/digital output cameras may provide improved resolution as compared to the video output IR device(s) currently in use at applicant's operations.

Gray scale levels of pixels contained in ROI #1 are measured with the vision system at step 115, and gray scale levels of pixels in ROI #2 are measured at step 117. In certain embodiments, for an 8-bit image, the gray scale value of a pixel can vary, for example, from 0 to 255. A value of zero (0) may represent black and a value of 255 may represent white (slag appears white), while different shades therebetween have intermediate values.

A bin is a range of pixel gray scale values or levels of an image of an object of interest. For example, a steel bin is a range of gray scale values of the image indicative of molten steel in the tap stream. The computer or software therein is programmed to include both a steel bin and a slag bin, so as to be able to determine how many pixels include molten slag and how many molten steel. The computer thus determines the number (from zero on up) of pixels that belong to or fall within the respective steel and slag bins for each image frame 115. In certain embodiments, the steel bin may represent pixels with gray scale levels of from about levels 60 to 160 as shown in FIGS. 6–8, and the slag bin may represent and identify pixels with gray scale levels of from about 230 to 255 as also shown in FIGS. 6–8. Pixels with gray scale values within neither bin are not classified as indicative of either steel or slag. By determining the number of pixels in each frame which falls into each bin, an approximate number of steel and slag pixels, respectively, can be determined. As shown at the upper left hand side of FIGS. 6–8, an operator can change the slag and steel bin values or ranges by clicking upward or downward in the "range slag" and/or "range steel" areas as shown, to customize these bins. Also, as shown at the left hand side of FIGS. 6–8, it is illustrated that the user can change the slag and steel colors shown on the monitor by clicking up or down with a mouse or the like. FIGS. 6–8 further illustrate that an operator may program particular ROIs to be viewed and may customize the same as to how large they are and where they are located.

Thus, at step 119 the number of viewed pixels of ROI #1 within the "range steel" bin parameters is determined as is the number of pixels within the "range slag" bin parameters for a given imaged frame. Similarly, at step 121 the number of viewed pixels of ROI #2 within the "range slag" bin parameters is determined. At step 123, it is determined whether the tap angle is within a predetermined tap angle range (if so, then the slag counter step 125 is performed; if not, then step 125 is skipped and SSR step 127 is performed). Assuming the converter is in the predetermined final tap angle range, then at step 125 a counter keeps increasing a value upon itself by the number of "range slag" bin pixels from ROI #1 determined at 119, to measure the amount of slag poured into the ladle in each heat.

A slag to steel ratio (SSR) for each image frame (e.g. binary image) is then determined 127 and displayed on the monitor using the following equation: SSR=# ROI #1 Slag Pixels/(# ROI #1 Slag pixels+# ROI #1 Steel pixels), so that SSR ranges from 0 to 1. When, as shown in FIG. 7, there is almost no slag in the tap stream, the SSR is near or equal to zero (illustrated as 0.00 in FIG. 7). As tapping progresses and slag is detected in the tap stream, the SSR value increases and approaches 1 (e.g. shown as 0.485 in FIG. 8). In preferred embodiments, the SSR ratio ranges from 0 to 1.0, and is an improvement over ratios that can range above 1.0.

For example, FIG. 7 illustrates the computer monitor during tapping when no substantial slag is present in the tap stream. The tap stream can be seen in the lower left hand box 109, with ROI #1 being outlined in dotted rectangular form in that box (the image frames are taken from the ROIs). The two smaller boxes 111, 113 illustrate that steel is present, but not substantial slag, in stream 9. However, FIG. 8 illustrates the computer monitor screen when substantial slag is present in the tap stream. Note the bright white color of the stream in box 111 of FIG. 8 illustrating slag. An alarm may also be provided which states "SLAG DETECTED !!!RAISE FURNACE NOW!!!." to the observing operator, when substantial slag is detected. Upon seeing/hearing this alarm, the operator raises the BOF and stops tapping.

Referring again to FIG. 9, SSR is calculated at 127 for each frame and time-averaged to determine the end of tap. Comparing the calculated SSR value to a predetermined slag to steel setpoint or threshold Th, is done at step 129. As shown in FIGS. 7–8, this threshold may be set to 0.40 or any other suitable number, depending on the grade of steel desired. This threshold is selected to drain as much molten steel from the converter without excessive slag carryover into the ladle. The threshold can be customized by the operator according to the quality requirements of different grades of steel. If very little slag carryover is required for a specific grade, then the alarm threshold Th, will be set to a values from about 0.05 to 0.10, for example. Then operators will be alarmed when a small quantity of slag is detected in the tap stream resulting in less slag carryover than if the threshold was set at a higher level. Whereas, if iron yield is more important, the threshold $Th_1$ can be set to a higher value, for example, from about 0.10 to 0.60, so that the alarm will only be actuated when large or substantial amounts of slag are detected in the tap stream. It should be understood that if the image quality is excellent, it is possible that Th, can be set to a value even greater than 0.60. These thresholds are for purposes of example only, and are not intended to be limiting in any way.

As shown in FIG. 9, if the SSR value does not exceed this threshold, then the tapping process continues and the next image frame is analyzed when step 108 is repeated. However, once the SSR value exceeds this alarm threshold (e.g. 0.40) at 129, and (i) it is determined that ROI #2 slag pixels is not greater than a predetermined permissible number of slag pixels at 131, and (ii) converter 3 is determined by sensor(s) to be tilted within a predetermined range of final tilt angles θ (e.g. from about 90 to 105 degrees) at step 133, then an alarm is actuated at 135. The alarm may be effected by either (i) an audio or visual alarm to alert the tapping operator to tilt the converter upward to stop tapping 137, or (ii) the system automatically causes the converter to tilt upward to stop tapping 137, or (iii) a pneumatic or hydraulically powered ram is inserted into the tap hol e to close the same and stop tapping 137. Tapping is ended 137, and the system returns to idle mode 101.

If it is determined at step 133 that the converter tap angle is not within a predetermined final tap angle range, then an early slag alarm is actuated at step 13 9 indicating that slag may be inadvertently being poured from the converter during early stages of tapping.

It is noted that in certain embodiments, a time averaged SSR is determined and the same compared to the threshold, while in other embodiments, SSR need not be time averaged. In time averaging embodiments, for example, the pro gram and/or computer can calculate the total number of slag pixels in ROI #1 (or ROI #2) by way of the following equation:

$$N = \sum_{i=1}^{m} A_i$$

where $A_i$ is the number of pixels in the slag bin in the $i^{th}$ image and is the total number of image frames between the time the furnace enters the final tapping angle range and end tap. A correlation between the total number of slag pixels and the actual amount of slag carryover can be achieved. The actual amount of slag carried over can be determined by physical slag depth measurements in the ladle, or through mass conservation calculations. This correlation (between physically measured slag and slag detected by the imaging system) may be used to predict the amount of slag carryover into the ladle with the attached imaging software.

According to certain embodiments of this invention, advisory alarm(s) 139 may be used to alert operator(s) of irregularities of the tapping process. During tap, slag can be carried over in the stream if converter 3 is not tilted correctly. The attached software checks continuously or periodically the tilt angle of the converter. If slag is detected in the tap stream, but the tilt angle is not within a predetermined tap angle e final range (e.g. 90°–105°), then advisory alarm 139 is actuated (either audio or visual) primarily to alert the operator(s) to correct the tilt angle.

Referring to steps 117, 121, 122 and 124 of FIG. 9, camera 13 (or another IR camera) monitors ROI #2 (see FIG. 1) at the same time that ROI #1 is monitored. An irregularity than can occur during tapping is slag spilling out of open upper mouth 301 of the converter. This occurs when converter 3 is tilted too far. The system detects this problem and alerts the operator(s) of the same or automatically causes the converter tilt angle to be corrected. To do this, ROI #2 is monitored by an IR camera and displayed on the monitor and analyzed by the imaging software. ROI #2 is above the tap hole, yet below the open mouth, as shown in FIG. 1. When a number of slag pixels in ROI #2 in a given frame is detected at step 122 to be greater than a predetermined "permissible" threshold or number of pixels, the system alarms the operator of the same, or causes the tilt angle to be automatically corrected at 124. From steps 122 and 124, the system proceeds to step 119 as tapping progresses.

During tapping it is common to observe slag streaking in the tap stream just before the end of tap. When streaking occurs, the SSR in the image software assumes a value greater than zero, but potentially lower than the SSR threshold $Th_1$. Optionally, in certain embodiments, the imaging system which continuously monitors SSR may be programmed to determine if SSR is in the range associated with streaking (e.g. greater than, for example, about 0.02 but lower than $Th_1$). If it is, then streaking is likely occurring and the system can actuate a visual or audio alarm to indicate to an operator that the end of tapping is nearing, or that the tilt angle is too small and that the furnace or vessel needs to be tilted to a greater angle.

Additionally, it is noted that software for carrying out certain steps herein may include, for example, automatic detection of start and end tap using captured images; automatic placement of ROI #1 to continuously center itself around or on the tap stream; determination of tap stream width using edge detection and width measurement; maintenance indicator for tap hole replacement (tap time, tap stream width); automatic converter 3 rotation/tilt upward/ downward for tapping process; slag detection; and provision of data base information to minimize or reduce ladle slag conditioner additions.

Figure 10:
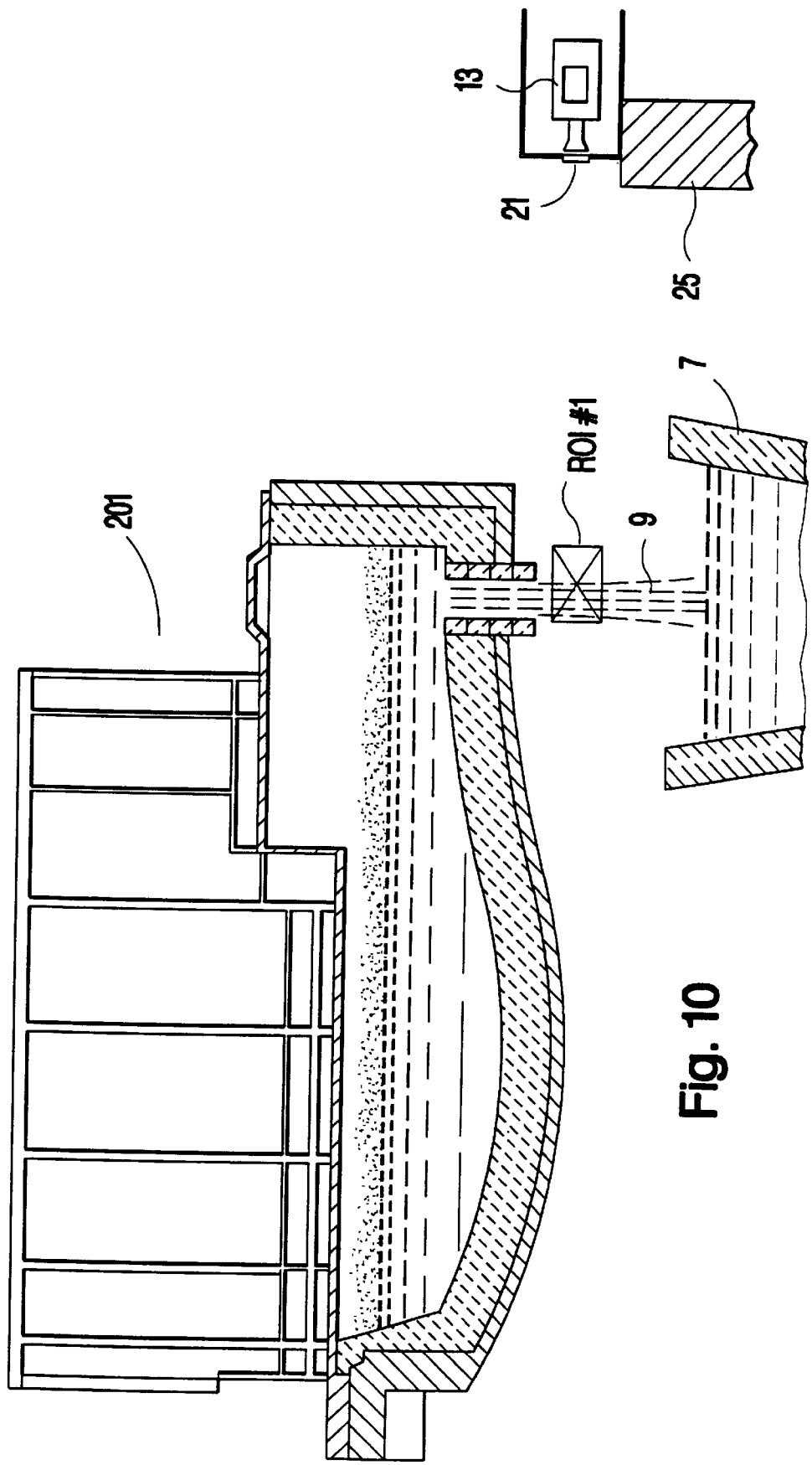
FIG. 10 is a schematic diagram of an embodiment of this invention wherein steel/slag is poured from an electric steel making furnace into a ladle, this embodiment being implementable with the steps shown in FIG. 9 and the description thereof.

Referring to FIG. 10, according to alternative embodiments of this invention, the camera, monitor, computer and programs of any embodiment discussed herein can be used with an electric furnace 201 in the production of steel, instead of in a BOF. Electric furnaces typically are exposed to environments similar to those surrounding a BOF, and electric steel-making furnaces have selectively opened/ closed bottom output ports from which molten steel flows into a ladle 7 located below same (i.e. there is no side taphole). In these embodiments, camera 13 views/images the molten hot metal stream 9 flowing from the furnace's bottom output port into the ladle, and detects the presence of slag therein in any manner set forth above. In the FIG. 10 embodiment, ROI #2 is not utilized, because there is no open upper mouth, and thus with reference to FIG. 9, steps 117, 121, 122, 124 and 131 need not be performed.

Figure 11:
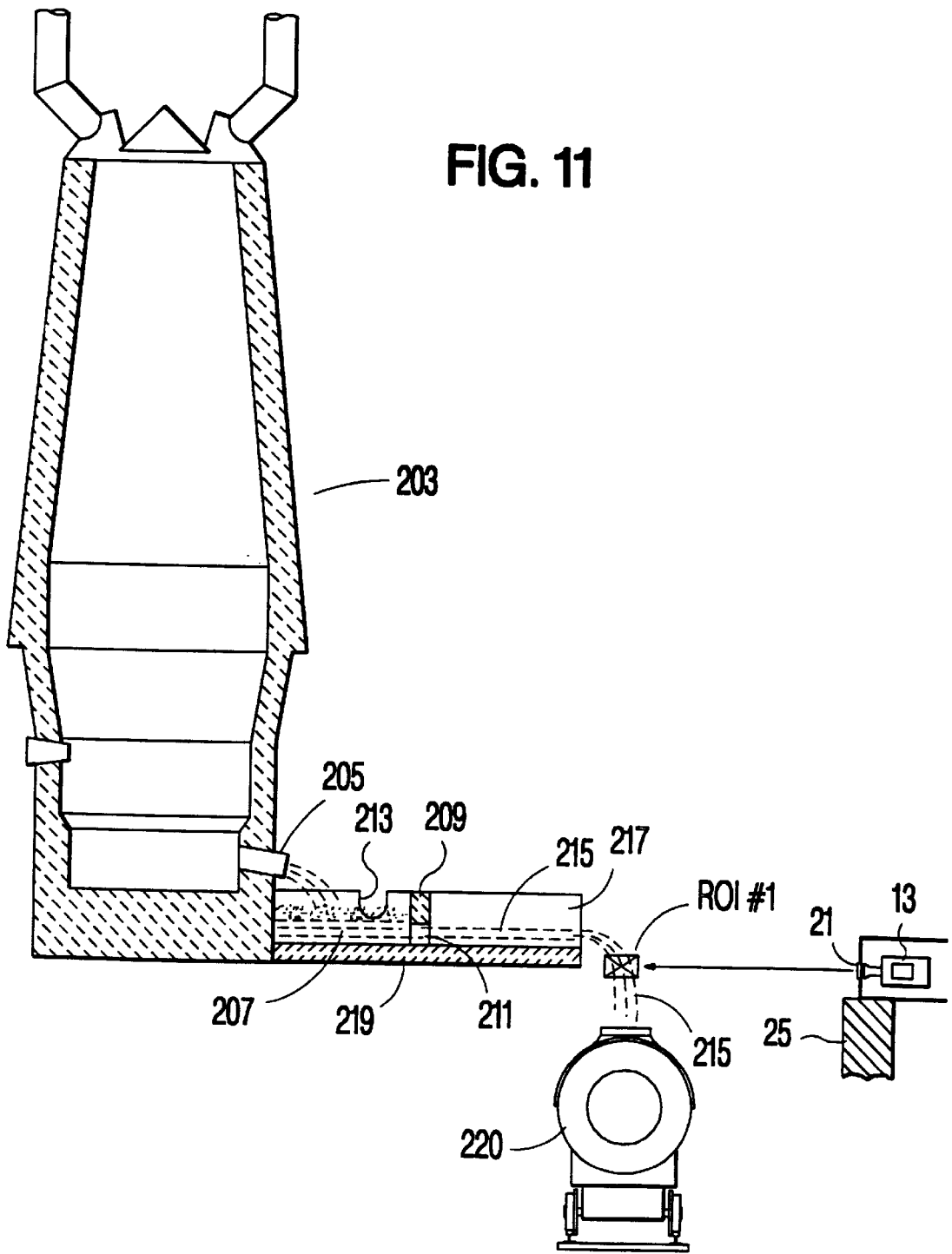
FIG. 11 is a schematic diagram showing the present invention in use at a blast furnace operation.

Referring to FIG. 11, another embodiment of this invention includes camera 13, the monitor, the computer, and programs discussed herein being used with a blast furnace 203 in the production of molten iron. Blast furnace tapping operations typically occur in dirty, dust laden environments similar to those surrounding BOF and electric furnace steel-making operations. However, in this instance, the opened tap hole 205 drains molten iron and slag into trough 207 where it is retained by dam 209 having an iron opening 211, and a higher slag opening 213 through which slag flows. The molten iron 215 flows through opening 211 and into runners 217 that extend along the casthouse floor 219 to a waiting refractory lined submarine car 220 where the iron is collected for further processing downstream in a steel-making operation. The slag is skimmed off the top of the molten iron through slag opening 213 and is collected in a waiting slag bucket (not shown) for further processing or disposal. However, as the level of the cast drops within trough 207, slag can become entrained within the molten iron flowing along the runners to the submarine car 220. In such instances, it is important for iron and steel makers to be able to determine slag content in the molten iron collected within the submarine car. Accordingly, camera(s) 13 views/ images the molten iron stream 215 flowing from the runner 217 into the submarine car 220, and detects the presence of slag therein in any manner set forth herein. In the FIG. 11 embodiment, ROI #2 is not utilized, because there is no upper mouth, and thus with reference to FIG. 9, steps 117, 121, 122, 124 and 131 need not be performed. Additionally, because a blast furnace is not rotated about a tilt axis, steps 123 and/or 133 in the FIG. 9 flowchart need not be performed.

According to additional alternative embodiments, the camera, monitor, computer, and programs of any embodiment of this invention may be used outside of the steel industry such as in smelting operations including the refining and/or manufacture of aluminum, copper, brass, and the like.

Once given the above disclosure, many other features, modifications, and improvements will become apparent to the skilled artisan. Such other features, modifications, and improvements are therefore considered to be a part of this invention, the scope of which is to be determined by the following claims.

We claim:

1. A method of detecting slag during tapping of a BOF converter in the manufacture of steel, the method comprising the steps of:
    providing the BOF converter for housing molten metal, with oxygen being introduced into the converter in order to form slag within the converter;
    providing a ladle into which the molten metal from the BOF converter flows;
    tapping the BOF converter so that a tap stream of the molten metal flows from the BOF converter into the ladle through at least a portion of a first region of interest (ROI #1), said tapping being performed by at least tilting the converter;
    IR imaging the tap stream in at least the ROI #1 during said tapping to provide at least one image frame;
    determining for pixels of the image frame a the number of pixels within a steel bin indicative of steel in the tap stream, and the number of pixels within a slag bin indicative of slag in the tap stream;
    determining a ratio ranging from 0 to 1.0 utilizing the steel number of pixels and the slag number of pixels;
    determining a tilt angle θ of the converter;
    determining whether the ratio is indicative of at least a preselected amount of slag in the tap stream;
    determining whether the tilt angle θ is greater than a value or within a tilt angle range; and
    stopping said tapping when it is determined that the ratio is indicative of at least the preselected amount of slag in the tap stream and that the tilt angle θ is greater than a value or within a tilt angle range.

2. The method of claim 1, further comprising, in response to determining that the ratio is indicative of at least the preselected amount of slag in the tap stream and that the tilt angle θ is greater than a value or within a tilt angle range, the step of actuating an alarm to alert an operator that tapping should be stopped.

3. The method of claim 1, further comprising, in response to determining that the ratio is indicative of at least the preselected amount of slag in the tap stream and that the tilt angle θ is greater than a value or within a tilt angle range, the step of automatically tilting the converter upwardly to stop tapping.

4. The method of claim 1, further comprising the step of automatically tilting the converter upwardly and stopping tapping of the BOF converter when it is determined that the ratio is indicative of a threshold amount of slag in the tap stream and that the tilt angle θ is greater than a value or within a tilt angle range.

5. The method of claim 1, wherein said IR imaging step includes using long IR wavelengths greater than or equal to about 8 μm in order to detect the presence of molten slag in the tap stream.

6. The method of claim 1, wherein during said IR imaging step, emissivity values of the slag in the molten metal tap stream between about 0.7 and 0.9 are imaged, and emissivity values of molten steel in the molten metal tap stream of less than about 0.25 are imaged and output on the monitor.

7. The method of claim 6, wherein during said IR imaging step, emissivity values of the molten steel in the tap stream of less than about 0.20 are imaged and output on the monitor.

8. The method of claim 1, wherein during said IR imaging step, only IR wavelengths greater than or equal to about 8 μm are used.

9. The method of claim 1, wherein the steps recited are performed in the order in which they are recited.

10. The method of claim 1, further comprising the steps of:
    IR imaging a second region of interest (ROI #2) located at least partially at an elevation below an open mouth of the converter; and
    actuating an alarm when it is determined that the number of pixels in a frame from ROI #2 is indicative of a threshold amount of slag.

11. The method of claim 10, wherein ROI #2 is not contiguous with ROI #1.

12. The method of claim 1, further comprising the steps of substantially filtering out wavelengths less than about 8 μm during said IR imaging so that long IR wavelengths are used to detect the presence of slag in the tap stream.

13. A basic oxygen furnace (BOF) system for use in the manufacture of steel, the BOF system comprising:

a BOF converter for holding molten steel and molten slag, the molten slag floating on top of the molten steel, said BOF converter including a tap hole defined therein for enabling the molten steel to flow therefrom;

a ladle positioned at a vertical elevation below the BOF converter for receiving molten steel which flows from the BOF converter via the tap hole in a tap stream;

an imaging device for imaging the tap stream of molten steel and molten slag flowing from the tap hole into the ladle in order to detect the presence of slag in the tap stream;

a sensor for determining a tilt angle of the converter; and means for causing tapping to be stopped when a substantial amount of slag has been detected in the tap stream and when the tilt angle of the converter is greater than a value or within a tilt angle range.

14. The system of claim 13, wherein said means includes means for actuating an alarm for indicating to an operator that tapping is to be stopped.

15. The system of claim 13, wherein said means includes means for automatically tilting the converter upwardly to stop tapping.

16. The system of claim 13, wherein said means includes one of: (a) means for moving a ram or stop into an aperture of the tap hole to stop tapping, and (b) means for displaying color indicative of slag in a tap stream on a monitor for an operator to see.

17. The system of claim 13, further including a filter for filtering out all IR wavelengths less than about 8 $\mu$m so that predominantly IR wavelengths of at least about 8 $\mu$m are used to detect slag in the tap stream.

18. The system of claim 13, wherein said imaging device is an IR imaging device, and wherein said imaging device images first and second non-contiguous preselected regions of interest simultaneously, said tap stream from said tap hole passing through said first region of interest but not said second region of interest, wherein said second region of interest is located at an elevation below an open mouth of the converter.

19. A method of pouring molten metal from a steel-making vessel during the manufacture of steel, the method comprising the steps of:

providing a steel-making vessel holding a volume of molten metal, the molten metal including molten steel and molten slag;

providing an IR imaging camera for monitoring a stream of molten metal flowing from the vessel;

tilting the vessel thereby causing molten metal to flow in the stream out of the vessel;

monitoring the stream with the IR imaging camera using at least some IR wavelengths;

determining for an image frame a first number of pixels indicative of steel in the stream, and a second number of pixels indicative of slag in the stream;

determining a ratio utilizing the first and second numbers of pixels;

determining whether the ratio is indicative of at least a preselected amount of slag in the stream; and stopping tapping when it is determined that the ratio is indicative of at least the preselected amount of slag in the stream.

20. The method of claim 19, further comprising measuring the amount of slag that flows through the stream from the vessel.

21. The method of claim 20, wherein said measuring step includes utilizing a slag counter adding a number indicative of slag pixels from a frame to a previous slag number indicative of slag already having flowed from the vessel.

22. The method of claim 18, wherein the vessel is one of a BOF converter and an electric steel-making furnace.

23. An apparatus for detecting slag in a molten tap stream flowing from a basic oxygen furnace (BOF) into a ladle during manufacturing of steel, the apparatus comprising:

a BOF for converting molten iron to molten steel, and for pouring said molten steel into the ladle in the form of the molten tap stream; and an IR camera for imaging said molten tap stream in order to determine if slag is present in said tap stream, said IR camera enabling emissivity values less than about 0.25 to be utilized in determining whether slag is present in said tap stream.

24. A method of pouring molten metal from a steel-making vessel during the manufacture of steel, the method comprising the steps of:

providing a steel-making vessel holding a volume of molten metal, the molten metal including molten steel and molten slag;

providing a camera for monitoring a stream of molten metal flowing from the vessel;

tilting the vessel thereby causing molten metal to flow in the stream from the vessel;

monitoring the stream with the camera;

determining gray scale values for a plurality of pixels in an image frame and assigning a gray scale value to each of said pixels in the image frame;

determining which of the pixels in the image frame has a gray scale value within a preselected slag gray scale range and which of the pixels in the image frame has a gray scale value within a preselected steel gray scale range and using the results to calculate a first number of pixels indicative of slag and a second number of pixels indicative of steel, respectively;

determining a ratio ranging from 0 to 1.0 utilizing the first and second numbers of pixels;

determining whether the ratio is indicative of at least a preselected amount of slag in the tap stream; and stopping said tapping when it is determined that the ratio is indicative of at least the preselected amount of slag in the tap stream.

25. A method of draining molten metal from a metallurgical vessel during the manufacture of a molten metal product, the method comprising the steps of:

providing the metallurgical vessel holding a volume of molten material including molten metal and molten slag;

providing an IR camera for monitoring a stream of molten material flowing from the metallurgical vessel;

determining for an image frame a first number of pixels indicative of molten metal in the stream, and a second number of pixels indicative of molten slag in the stream;

determining a ratio utilizing the first and second numbers;

determining whether the ratio is indicative of at least a threshold amount of molten slag in the stream; and stopping tapping when it is determined that the ratio is indicative of at least the threshold amount of slag being in the stream.

26. The method of claim 25, wherein the metallurgical vessel is a blast furnace and the molten metal includes iron.

27. The method of claim 25, wherein the molten metal is non-ferrous.

* * * * *